(12) United States Patent
Kalush et al.

(10) Patent No.: US 12,174,916 B2
(45) Date of Patent: Dec. 24, 2024

(54) METHOD AND APPARATUS FOR CONTRACT ANALYSIS

(71) Applicant: EMC IP Holding Company LLC, Hopkinton, MA (US)

(72) Inventors: Noam Kalush, Be'er Sheva (IL); Anat Parush Tzur, Be'er Sheva (IL); Idan Richman Goshen, Be'er Sheva (IL); Lisa Woo, Arcadia, CA (US); Emer Fitzpatrick, Celbridge (IE); Skye Jones, Georgetown, TX (US); Balaji Dhamodharan, Round Rock, TX (US); Christopher Schneider, Vlamao (BR); Daniel Coutinho, Fortaleza (BR); Joao Adalino Lopes de Moraes, Jr., Guaiba (BR); Guilherme Toralles Darley, Porto Alegre (BR); Eder Soares, Eusebio (BR); Lidiane Silva, Fortaleza (BR); Amihai Savir, Sansana (IL); Carlos Augusto Barra, Indaiatuba (BR); Eder Crespo, Novo Hamburgo (BR)

(73) Assignee: EMC IP Holding Company LLC, Hopkinton, MA (US)

( * ) Notice: Subject to any disclaimer, the term of this patent is extended or adjusted under 35 U.S.C. 154(b) by 453 days.

(21) Appl. No.: 17/383,537

(22) Filed: Jul. 23, 2021

(65) Prior Publication Data

US 2023/0028534 A1 Jan. 26, 2023

(51) Int. Cl.
*G06F 18/22* (2023.01)
*G06F 18/23* (2023.01)
(Continued)

(52) U.S. Cl.
CPC .............. *G06F 18/22* (2023.01); *G06F 18/23* (2023.01); *G06F 40/205* (2020.01); *G06Q 50/188* (2013.01); *G06V 30/416* (2022.01)

(58) Field of Classification Search
CPC .......... G06F 18/00; G06F 18/22; G06F 18/23; G06F 40/00; G06F 40/205; G06V 30/00; G06V 30/416; G06Q 50/00; G06Q 50/188
See application file for complete search history.

(56) References Cited

U.S. PATENT DOCUMENTS 10,162,850 B1 * 12/2018 Jain .......................... G06F 40/30
2016/0026620 A1 * 1/2016 Gidney ................... G06F 40/30
705/311

(Continued)

FOREIGN PATENT DOCUMENTS

WO WO-2020063524 A1 * 4/2020

*Primary Examiner* — Daniel C Washburn
*Assistant Examiner* — Sean E Serraguard
(74) *Attorney, Agent, or Firm* — Daly, Crowley, Mofford & Durkee, LLP

(57) ABSTRACT

A method is provided comprising: obtaining a counterparty contract, the counterparty contract including a contract that is being proposed by a counterparty to a user; performing a segmentation of the counterparty contract to identify a plurality of sentence clusters, each of the sentence clusters corresponding to a different provision in the counterparty contract; generating a plurality of counterparty provision vectors based on the counterparty contract, each of the counterparty provision vectors being generated based on a different one of the plurality of sentence clusters; retrieving a user provision vector, the user provision vector corresponding to a user provision; calculating a plurality of similarity scores for the user provision vector; detecting whether the plurality of similarity scores satisfies a condition (Continued)

that is associated with the user provision; and outputting a notification associated with the user provision when the condition is satisfied.

18 Claims, 7 Drawing Sheets

(51) Int. Cl.
*G06F 40/205* (2020.01)
*G06Q 50/18* (2012.01)
*G06V 30/416* (2022.01)

(56) References Cited

U.S. PATENT DOCUMENTS

| | | | |
|---|---|---|---|
| 2018/0189272 A1* | 7/2018 | Noh | G06N 3/045 |
| 2018/0268506 A1* | 9/2018 | Wodetzki | G06N 5/046 |
| 2020/0327172 A1* | 10/2020 | Coquard | G06F 16/9035 |
| 2021/0125297 A1* | 4/2021 | Doran | G06N 20/00 |
| 2022/0414153 A1* | 12/2022 | Slattery | G06F 18/40 |

* cited by examiner

122

```
COUNTERPARTY NDA

[ COUNTERPARTY PROVISION 1 ]
    [ COUNTERPARTY PROVISION 2 ]
    [ COUNTERPARTY PROVISION 3 ]
              • • • •
```

```
USER NDA TEMPLATE

[ USER PROVISION VECTOR 1 ]
          /REQUIRED/

[ USER PROVISION VECTOR 2 ]
         /RECOMMENDED/

[ USER PROVISION VECTOR 3 ]
         /RECOMMENDED/

[ USER PROVISION VECTOR 4 ]
          /FORBIDDEN/
              • • • •
```

FIG. 2B

METHOD AND APPARATUS FOR CONTRACT ANALYSIS

BACKGROUND

Each business organization phrases and structures its non-disclosure agreement (NDA) template according to its own legal requirements. Due to this fact, counterparty templates can vary significantly by both format, terms and conditions. Whenever negotiators face a new type of template, they need to go over the entire NDA content numerous times in order to get familiar with its new structure and to be able to figure out which of the template's terms and conditions are present and which are absent. Such a manual process is repetitive and highly time consuming.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, a method is provided comprising: obtaining a counterparty contract, the counterparty contract including a contract that is being proposed by a counterparty to a user; performing a segmentation of the counterparty contract to identify a plurality of sentence clusters, each of the sentence clusters corresponding to a different provision in the counterparty contract; generating a plurality of counterparty provision vectors based on the counterparty contract, each of the counterparty provision vectors being generated based on a different one of the plurality of sentence clusters; retrieving a user provision vector, the user provision vector corresponding to a user provision; calculating a plurality of similarity scores for the user provision vector, the plurality of similarity scores being calculated based on the user provision vector and the plurality of counterparty provision vectors, each of the plurality of similarity scores indicating a degree of similarity between the user provision vector and a respective one of the plurality of counterparty provision vectors; detecting whether the plurality of similarity scores satisfies a condition that is associated with the user provision; and outputting a notification associated with the user provision when the condition is satisfied, the notification being output only when the condition is satisfied.

According to aspects of the disclosure, a system is provided, comprising: a memory; and at least one processor, the at least one processor being configured to perform the operations of: obtaining a counterparty contract, the counterparty contract including a contract that is being proposed by a counterparty to a user; performing a segmentation of the counterparty contract to identify a plurality of sentence clusters, each of the sentence clusters corresponding to a different provision in the counterparty contract; generating a plurality of counterparty provision vectors based on the counterparty contract, each of the counterparty provision vectors being generated based on a different one of the plurality of sentence clusters; retrieving a user provision vector, the user provision vector corresponding to a user provision; calculating a plurality of similarity scores for the user provision vector, the plurality of similarity scores being calculated based on the user provision vector and the plurality of counterparty provision vectors, each of the plurality of similarity scores indicating a degree of similarity between the user provision vector and a respective one of the plurality of counterparty provision vectors; detecting whether the plurality of similarity scores satisfies a condition that is associated with the user provision; and outputting a notification associated with the user provision when the condition is satisfied.

According to aspects of the disclosure, a non-transitory computer-readable medium is provided storing one or more processor-executable instructions, which, when executed by at least one processor, cause the at least one processor to perform the operations of: obtaining a counterparty contract, the counterparty contract including a contract that is being proposed by a counterparty to a user; performing a segmentation of the counterparty contract to identify a plurality of sentence clusters, each of the sentence clusters corresponding to a different provision in the counterparty contract; generating a plurality of counterparty provision vectors based on the counterparty contract, each of the counterparty provision vectors being generated based on a different one of the plurality of sentence clusters; retrieving a user provision vector, the user provision vector corresponding to a user provision; calculating a plurality of similarity scores for the user provision vector, the plurality of similarity scores being calculated based on the user provision vector and the plurality of counterparty provision vectors, each of the plurality of similarity scores indicating a degree of similarity between the user provision vector and a respective one of the plurality of counterparty provision vectors; detecting whether the plurality of similarity scores satisfies a condition that is associated with the user provision; and outputting a notification associated with the user provision when the condition is satisfied.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

FIG. 2A is a diagram of an example of a counterparty non-disclosure agreement (NDA), according to aspects of the disclosure;

FIG. 2B is a diagram of an example of a user NDA template, according to aspects of the disclosure;

DETAILED DESCRIPTION

Figure 1:
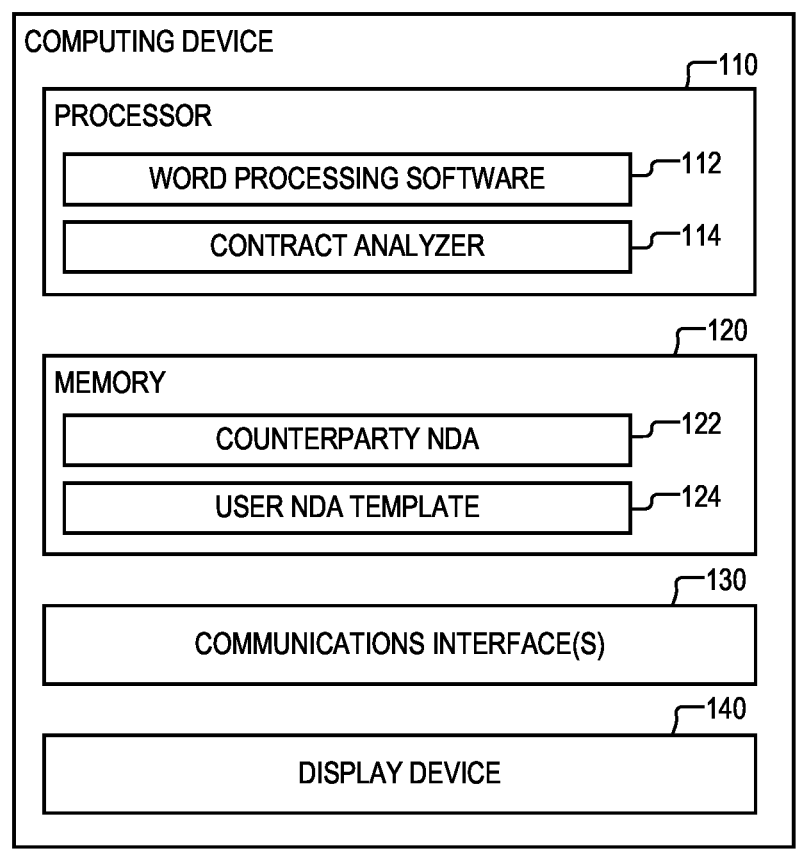
FIG. 1 is a diagram of an example of a computing device, according to aspects of the disclosure.

FIG. 1 is a diagram of an example of a computing device 100, according to aspects of the disclosure. The computing device 100 may include a desktop computer, a laptop computer, a smartphone, and/or any other suitable type of computing device. As illustrated, the computing device may include a processor 110, a memory 120, a communications interface 130, and a display device 140. The processor 110 may include any suitable type of processing circuitry, such as one or more of an integrated circuit (ASIC), a field-programmable gate array (FPGA), and/or a general-purpose processor (e.g., an ARM-based processor, an x86 processor, etc.). The memory 120 may include any suitable type of volatile and/or non-volatile memory. For example, in some implementations, the memory 120 may include one or more of random-access memory (RAM), a read-only memory (ROM), a solid-state drive (SSD), electrically erasable programmable read-only memory (EEPROM), a network-accessible storage (NAS), a redundant array of independent disks (RAID) and/or any other suitable type of memory. The communications interface 130 may include a Bluetooth interface, a Wi-Fi interface, a ZigBee interface, a Universal Serial Bus (USB) interface, and/or any other suitable type of interface. Although in the example of FIG. 1 the device 100 is depicted as an integrated system, it will be understood that alternative implementations are possible in which the test execution system is a distributed system, comprising a plurality of computing devices that are connected to one another via a communications network.

The processor 110 may be configured to execute word processing software 112 and a contract analyzer 114. The word processing software 112 may include custom word processing software or word processing software that is openly available on the market, such as MS Word™, Word Perfect™, Open Office Writer™, Kate™, Emacs™, etc. The contract analyzer 114 may include software for analyzing a contract (e.g., a non-disclosure agreement (NDA)) that is open in the word processing software 112. According to the present example, the contract analyzer 114 is implemented as a module (or plug-in) to the word processing software 112. However, alternative implementations are possible in which the contract analyzer 114 is implemented as a stand-alone application. In some implementations, the contract analyzer 114 may be configured to execute any of processes 500, 600, and 700, which are discussed further below with respect to FIGS. 5-7. Although the examples provided throughout the disclosure concern analyzing non-disclosure agreements, it will be understood that the contract analyzer 114 can be configured to analyze any suitable type of contract document.

The memory 120 may store a counterparty NDA 122 and a user NDA template 124. As used thoroughwort the disclosure, the term "user" shall refer to the person and/or organization that is using the contract analyzer 114 to analyze a contract (e.g., an NDA) that is provided by the counterparty. As used throughout the disclosure, the term "counterparty" shall refer to a person or entity that is involved in contract negotiations with the user. As used throughout the disclosure, the term "user provision" may refer to a provision that is found in an NDA form (or form for another type of contract) that is used by the user. As used throughout the disclosure, the term "counterparty provision" may refer to a provision that is found in an NDA (or another type of contract) that is proposed by the counterparty to the user.

The mechanics of negotiating non-disclosure agreements is now described in further detail. Every international business organization (or user) conducts on a daily basis, through different departments, negotiations over dozens of NDAs (and other contracts) with counterparties it wishes to cooperate or conduct business with. The task of performing the negotiations on the content and details of each NDA (or other type of contract) is currently performed by support team members and local counsel for the organization. The organization may have a standard NDA form (or standard form for another type of contract), which has been confirmed by the organization's legal department to comply with the organization's legally approved T&C (Terms and Conditions). The form may include one or more of: (i) required provisions, (ii) forbidden provisions, and (iii) recommended provisions. According to the present disclosure, a "required" provision is a provision that must be present in every NDA (or another type of contract) that is signed (or agreed-upon) by the organization. A "forbidden" provision is a provision that must never be present in an NDA (or another type of contract) that is signed (or agreed-upon) by the organization. And a "recommended provision" is a provision that may or may not be included in an NDA (or another type of contract) that is signed (or agreed-upon) by the organization, but which is preferred to be included. The term "provision" as used herein pertains to the meaning of one or more sentences that are part of a contract, and which discuss a specific legal issue, that is being addressed by the contract. Examples of provisions include a standard of care provision, a survival provision, a provision that specifies a protection period, a disclosing parties provision, or a binding agreement provision, etc.

During NDA negotiations, the organization (e.g., the user) may offer its own NDA form (or form for another type of contract) to a counterparty it negotiates with. However, because counterparties often prefer to use their own NDA form, or to request edits to the organization's form, legal review and support is required. Moreover, many such counterparties strictly refuse to negotiate over NDAs based on any form other than their own. Negotiating over a counterparty NDA form requires the organization's negotiator (e.g., the user) to be able to review many variations of NDA formats and terms and conditions, determine whether all must-have provisions are present in the counterparty form, and further verify that no forbidden provisions are being introduced. These tasks are highly time-consuming and require a significant investment of time to complete. As is discussed further below, the contract analyzer 114 may automate some of the tasks associated with the review of proposed counterparty contracts, and NDAs in particular. In this regard, the contract analyzer 114 may serve as a tool for increasing the efficiency at which contracts are analyzed by legal departments and various types of organizations.

FIG. 2A is a diagram of the counterparty NDA 122, according to aspects of the disclosure. According to the present example, the counterparty NDA 122 is a text document (e.g., a Word™ document or a plain text document, etc.). The counterparty NDA 122 may include a plurality of counterparty provisions. Each of the counterparty provisions may include one or more sentences that concern the same legal issue (e.g., governing law, warranty, standard of care, etc.). Additionally or alternatively, in some implementations, each of the counterparty provisions may include one or more sentences that specify the counterparty's and/or user's obligations with respect to the same legal issue. Although the counterparty NDA 122 is depicted as including at least three counterparty provisions it will be understood that the present disclosure is not limited to the counterparty NDA 122 including any specific number of counterparty provisions.

FIG. 2B is a diagram of the user NDA template 124, according to aspects of the disclosure. The user NDA template 124 may include one or more objects that constitute a representation of an NDA form of the user. The user NDA template 124 may be generated by processing the NDA form by using standard natural language processing techniques. Additionally or alternatively, in some implementations, the NDA from, which is used as a basis for generating the user NDA template 124, may be annotated to identify different provisions that are part of the NDA form, as well as the respective categories for the provisions. As indicated by context, the terms "user NDA form" and "user NDA template" may be used interchangeably throughout the disclosure.

The user NDA template 124 may include a plurality of user provision vectors. Each of the user provision vectors may be include a vector representation of a different user provision. Each user provision may include one or more sentences (from the user NDA form) that concern the same legal issue, which is being addressed by the NDA form. Additionally or alternatively, each user provision include one or more sentences that specify the counterparty's and/or user's obligations with respect to the same legal issue. Each of the user provision vectors in the user NDA template 124 may be generated by processing, with Word2Vec or a similar technique, a different user provision of the user NDA form. As indicated by context, the phrases "user provision vector" and "user provision" may be used interchangeably throughout the disclosure.

The user NDA template 124 may identify a respective category for each of the user provision vectors. As noted above, according to the present example, the set of user provision categories includes "required", "forbidden", and "recommended". However, it will be understood that the present disclosure is not limited to any specific set of categories for the classification of contractual provisions. In some implementations, the respective category of each user provision may be assigned manually to the user provision, and/or it may be specified in the user NDA form.

According to the example of FIG. 2B, the user NDA template 124 includes at least four user provision vectors, which are enumerated as user provision vectors 1 through 4. By way of example, user provision vector 1 may be generated by processing a provision from the user NDA form that concerns a standard of care, and it may be categorized as a required provision. User provision vector 2 may be generated by processing a provision from the user NDA form that concerns governing law, and it may be categorized as a recommended provision. User provision vector 3 may be generated by processing a warranty provision from the user NDA form, and it may be categorized as a recommended provision. And user provision vector 4 may be generated by processing a provision from the user NDA form that concerns available remedies, and it may be categorized as "forbidden." Although the user NDA template 124 is depicted as including at least four user provision vectors, it will be understood that the present disclosure is not limited to the user NDA template 124 including any specific number of user provision vectors.

In some implementations, each of the user provision vectors in the user NDA template 124 may be generated by using text2vec or another similar technique. Each of the user provision vectors may include a plurality of bits, wherein each bit corresponds to a different word in a set of words. If a given bit in a user provision vector is set to '1', this may indicate that the given bit's respective word is present in the sentence cluster used as a basis for generating the user provision vector. On the other hand, if the given bit is set to '0', this may indicate that the given bit's respective word is absent from the sentence cluster that is used as a basis for generating the user provision vector.

Figure 3:
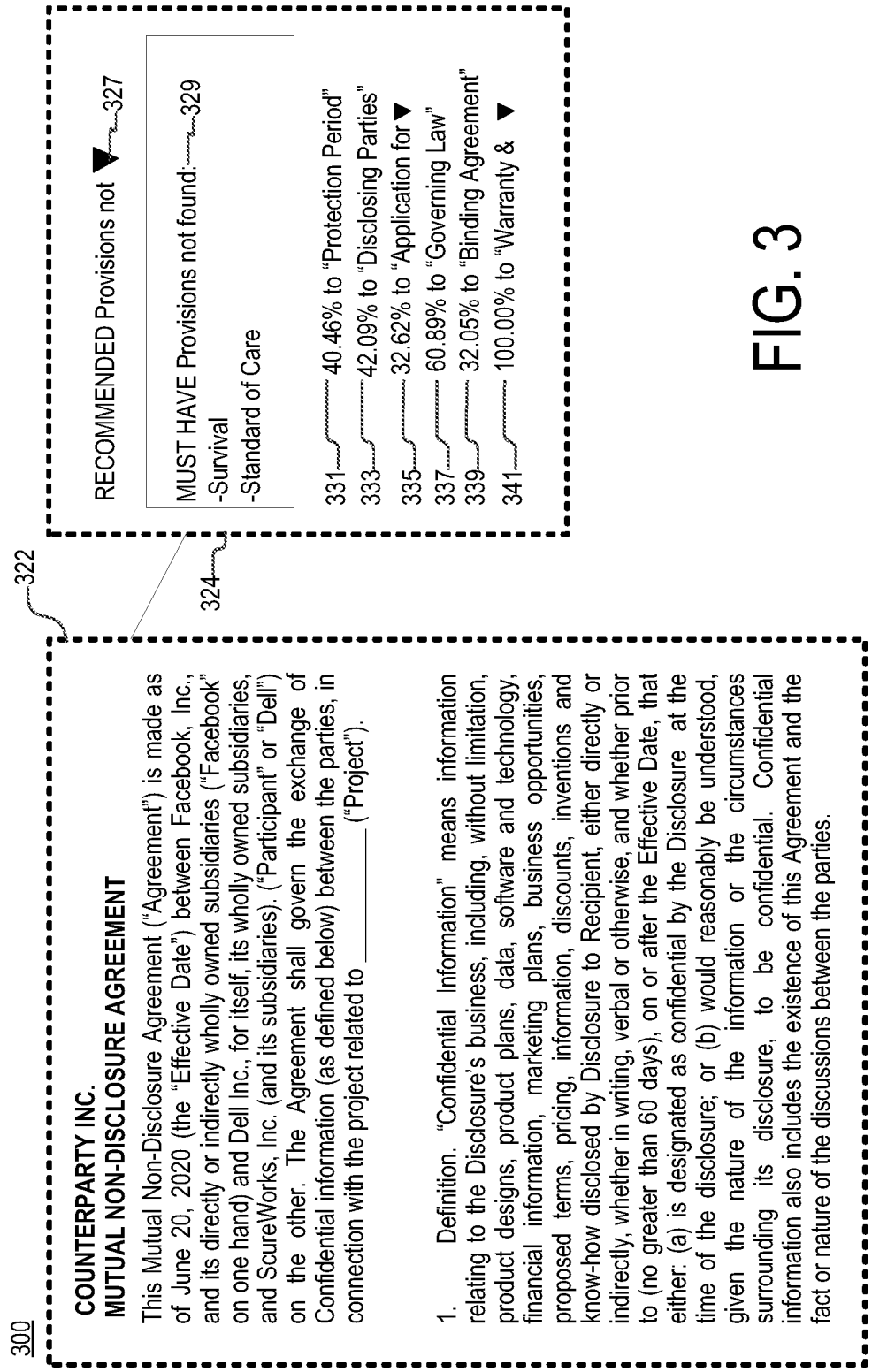
FIG. 3 is a diagram of an example of a user interface, according to aspects of the disclosure.
Figure 4:
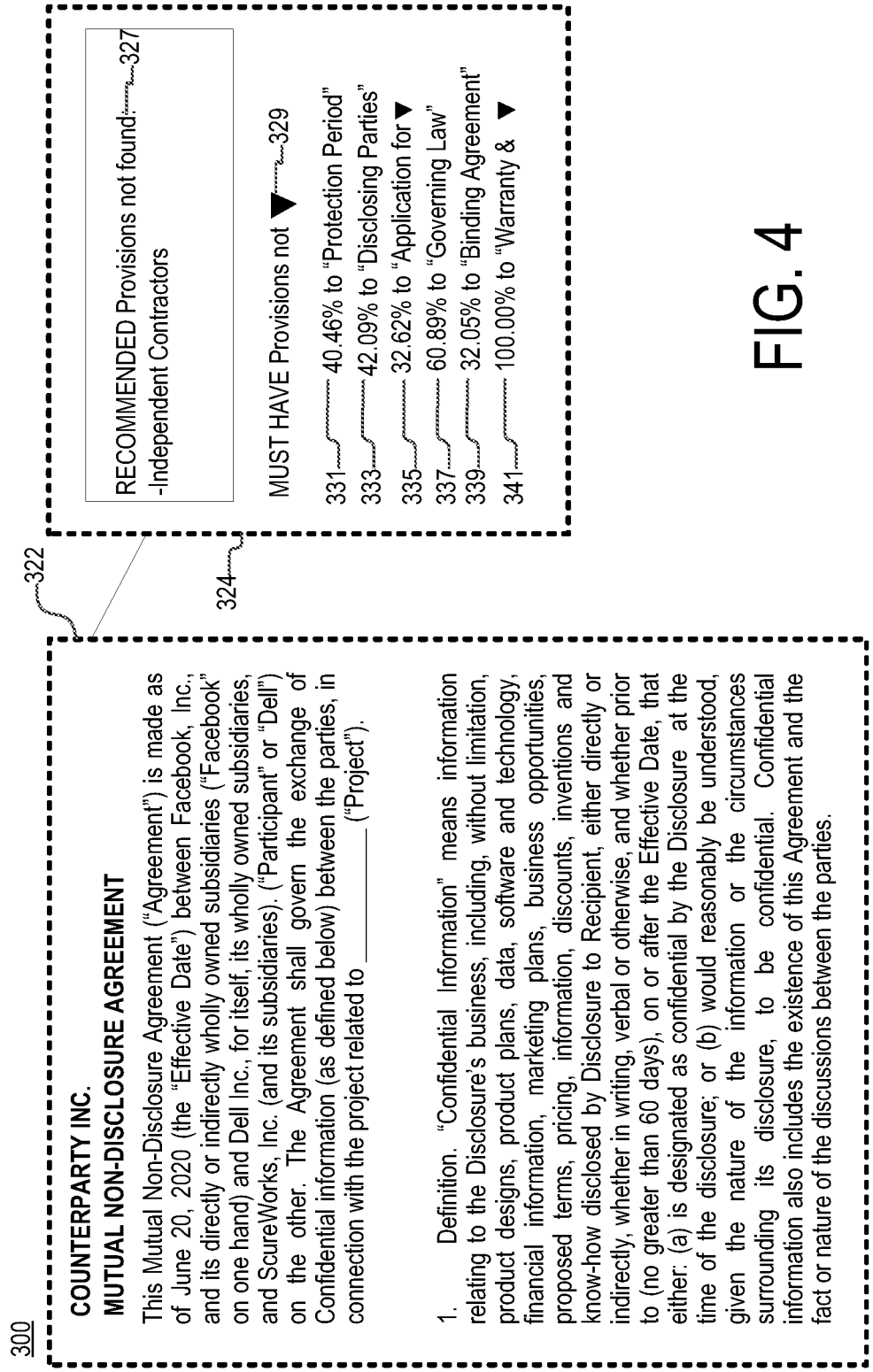
FIG. 4 is a diagram of an example of a user interface, according to aspects of the disclosure.

FIGS. 3-4 show an example of a user interface 300 of the word processing software 112, according to aspects of the disclosure. The interface may be displayed on the display device 140 (shown in FIG. 1) As illustrated, the user interface 300 may include a portion 322 and a portion 324. Portion 322 may be configured to display the text of the counterparty NDA 122, and portion 324 may be configured to display notifications 327-341. Notification 327 may identify one or more "recommended" user provisions that are missing from the text of the counterparty NDA 122, and which are recommended by the user NDA template 124. As shown in FIG. 4, notification 327 may indicate that the counterparty NDA 122 is missing an "Independent Contractor" provision. Notification 329 may identify one or more "required" provisions that are missing from the counterparty NDA 122, and which are required by the user NDA template 124. As shown in FIG. 43, notification 327 indicates that the counterparty NDA 122 is missing a "Survival" provision that is required by the user NDA template 124, as well as a "Standard of Care" provision, which is also is required by the user NDA template 124.

Notification 331 indicates that the counterparty provision (in the counterparty NDA 122), which most closely matches a "Protection Period" user provision (from the user NDA template 124) has a similarity score of 40.46%. Notification 333 indicates that the counterparty provision (in the counterparty NDA 122), which most closely matches a "Disclosing Parties" user provision (from the user NDA template 124) has a similarity score of 42.09%. Notification 335 indicates that the counterparty provision (in the counterparty NDA 122), which most closely matches an "Application for Credit" user provision (from the user NDA template 124) has a similarity score of 32.69%. Notification 337 indicates that the counterparty provision (in the counterparty NDA 122), which most closely matches a "Governing Law" user provision (from the user NDA template 124) has a similarity score of 60.89%. Notification 339 indicates that the counterparty provision (in the counterparty NDA 122), which most closely matches a "Binding Agreement" user provision (from the user NDA template 124) has a similarity score of 32.05%. And notification 341 indicates that the counterparty provision (in the counterparty NDA 122), which most closely matches a "Binding Agreement" user provision (from the user NDA template 124) has a similarity score of 100%.

As used throughout the disclosure, the phrase "notification associated with a user provision" may refer to any indication that the user provision is present or absent from a counterparty contract. In one example, a notification associated with a user provision may include a list that includes the user provision as well other provisions. The list may identify all (or some) user provisions that are missing from the counterparty NDA 122 (e.g., see notifications 327 and 329). In another example, a notification of a user provision may include a text string that identifies the user provision, as well as a similarity score for the user provision. The similarity score may indicate the similarity between the user provision and the counterparty provision in the counterparty NDA 122 that is the most similar to the user provision. Although in the example of FIGS. 3-4 each of the notifications 327-341 includes text, alternative implementations are possible in which one or more of the notifications 324-341 includes highlighting, an image, and/or any other suitable type of visual or audio element. Although in the example of FIGS. 3-4, the notifications 324-341 are displayed as comments to a text document that is open in a word processor, alternative implementations are possible in which the notifications 324-341 are generated in a separate file (or a separate object), which could be used as a checklist for evaluating the counterparty NDA 122.

In one respect, FIGS. 3-4 indicate that the contract analyzer 114 may be used to enhance the operation of an existing word processor by providing the word processor with tools that are especially well-suited for the analysis of contracts. For example, by displaying similarity scores next to the names of different user provisions, the contract analyzer 114 may inform users of the word processing software 112 about the degree to which any of the user provisions in the user NDA form (used as a base for generating the user NDA template 124) is matched by the counter party provisions in the counterparty NDA 122. As another example, the contract analyzer 114 may identify to the user of the word processing software 112 all (or some) required user provisions that are missing from the counterparty NDA 122. As yet another example, the contract analyzer 114 may alert the user of the word processing software 112 to any forbidden provisions that are included in the counterparty NDA 122.

Figure 5:
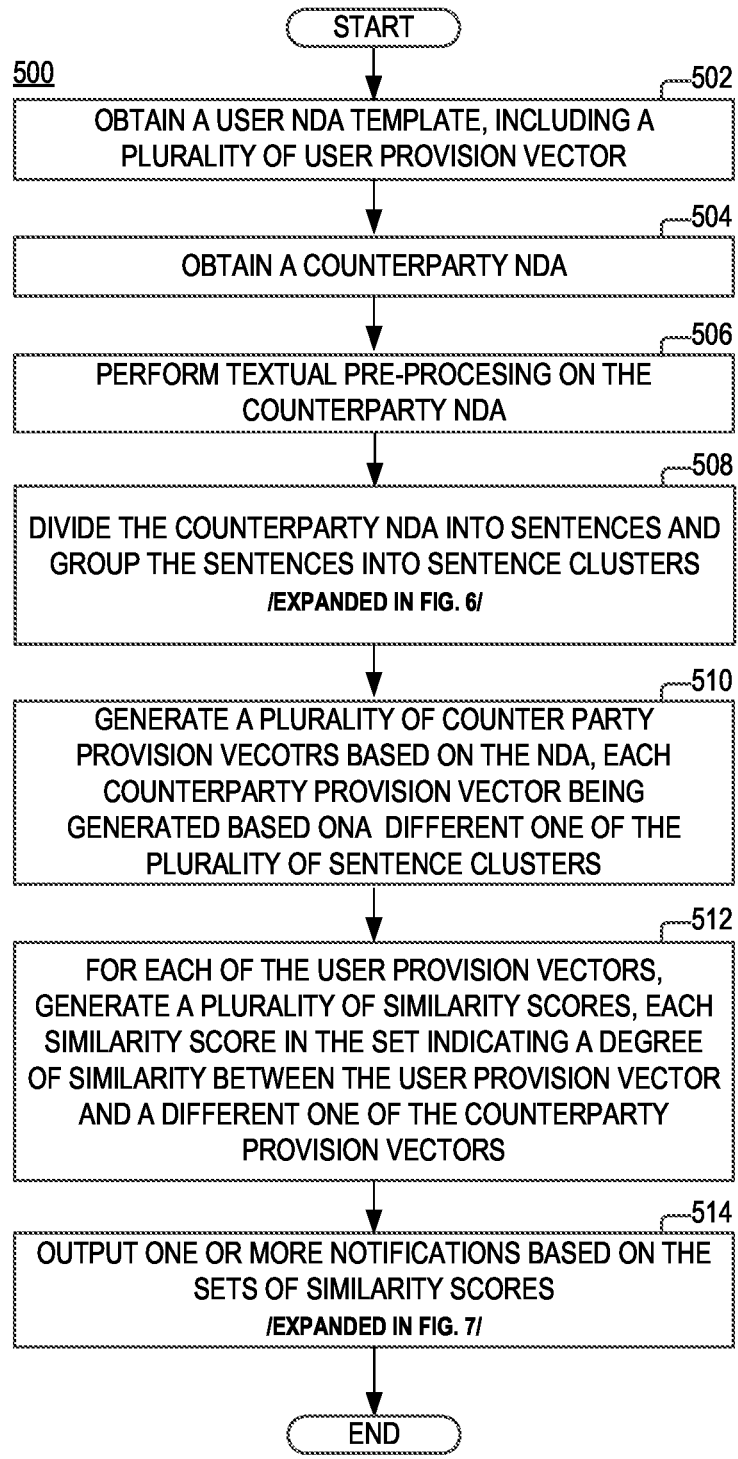
FIG. 5 is a flowchart of an example of a process, according to aspects of the disclosure.

FIG. 5 is a flowchart of an example of a process 500, according to aspects of the disclosure.

At step 502, the contract analyzer 114 obtains the user NDA template 124. According to the present example, obtaining the user NDA template 124 includes retrieving the user NDA template 124 from the memory 120. However, alternative implementations are possible in which obtaining the user NDA template 124 includes retrieving the user NDA template 124 from a remote storage device and/or receiving the user NDA template 124 over a communications network.

At step 504, the contract analyzer 114 obtains the counterparty NDA 122. According to the present example, obtaining the counterparty NDA 122 includes retrieving the counterparty NDA 122 from the memory 120. However, alternative implementations are possible in which obtaining the counterparty NDA 122 includes retrieving counterparty NDA 122 from a remote storage device and/or receiving the counterparty NDA 122 over a communications network.

At step 506, the contract analyzer 114 performs pre-processing on the counterparty NDA 122. The pre-processing replacing a set of different synonymous words (that are found in the counterparty NDA) with a single word (e.g., with one of the words in the set, etc.). Additionally or alternatively, the pre-processing of the counterparty NDA may include cleaning, stemming, and or any suitable technique for text pre-processing.

At step 508, the contract analyzer 114 divides the counterparty NDA 122 into sentences, and groups the sentences into sentence clusters. Each of the sentence clusters may correspond to a different counterparty provision in the counterparty NDA 122. In some implementations, each of the sentence clusters may be generated by using a natural language processing technique for grouping sentences that concern the same topic (or subject). Additionally or alternatively, in some implementations, step 508 may be performed by executing a process 600, which is discussed further below with respect to FIG. 6.

At step 510, the contract analyzer 114 generates a plurality of counterparty provision vectors. Each counterparty provision vectors may be generated based on a different respective one of the sentence clusters (identified of step 508). Each of the counterparty provision vectors may include a vector representation of a different one of the sentence clusters. Each of the counterparty provision vectors may be generated by using text2vec or another similar technique. Each of the counterparty provision vectors may include a plurality of bits, wherein each bit corresponds to a different word in a set of words. If a given bit in a counterparty provision vector is set to '1', this may indicate that the given bit's respective word is present in the sentence cluster used as a basis for generating the counterparty provision vector. On the other hand, if the given bit is set to '0', this may indicate that the given bit's respective word is absent from the sentence cluster that is used as a basis for generating the counterparty provision vector.

At step 512, the contract analyzer 114 generates a respective set of similarity scores for each of the user provision vectors in the user NDA template. Each set may be generated by comparing a respective one of the user provision vectors (in the user NDA template 124) to the counterparty provision vectors (generated at step 510). In any given set of similarity scores, each similarity score may identify a degree of similarity between the given set's respective user provision vector and a different one of the counterparty provision vectors (generated at step 510). In some implementations, in any given set of similarity scores, each similarity score may be calculated by normalizing a distance between the given set's respective counterparty provision vector and a different one of the user provision vectors in the user NDA template 124.

At step 514, the contract analyzer 114 generates and outputs one or more notifications. Each of the notifications may be associated with at least one user provision vector that is part of the user NDA template 124. In some implementations, each of the generated notifications may be the same or similar to one of the notifications 329-341, which are discussed above with respect to FIGS. 3-4. According to the present example, outputting the notifications includes displaying the notifications on the display device 140. However, alternative implementations are possible in which outputting any of the notifications includes one or more of: (i) streaming the notification into a file, (ii) transmitting the notification over a communications network, (iii) providing the notifications to a component of a word processing application, (iv) generating audio, (v) generating vibration, and/or taking any other suitable type of action. In some implementations, step 514 may be performed in accordance with a process 700, which is discussed further below with respect to FIG. 7.

For example, and without limitation, any of the notifications (generated at step 514) may identify a user provision that is required by the user NDA template 124, which is not found in the counterparty NDA 122. As can be readily appreciated, such notification may notify the user of the contract analyzer 114 that the counterparty NDA is missing a required provision and prompt the user to enter into negotiations for including the required provision into an agreed-upon NDA. As another example, any of the notifications (generated at step 514) may identify a user provision that is forbidden by the user NDA template 124, which is present in the counterparty NDA 122. As can be readily appreciated, such notification may notify the user of the contract analyzer 114 that the counterparty NDA includes a forbidden provision and alert the user that he or she should not adopt the counterparty NDA 122 unless the forbidden provision is removed. As yet another example, any of the notifications (generated at step 514) may identify a recommended provision that is missing from the counterparty NDA. As yet another example, any of the notifications (generated at step 514) may identify a required/recommended provision that is present in the counterparty NDA or a forbidden provision that is missing from the counterparty NDA.

Figure 6:
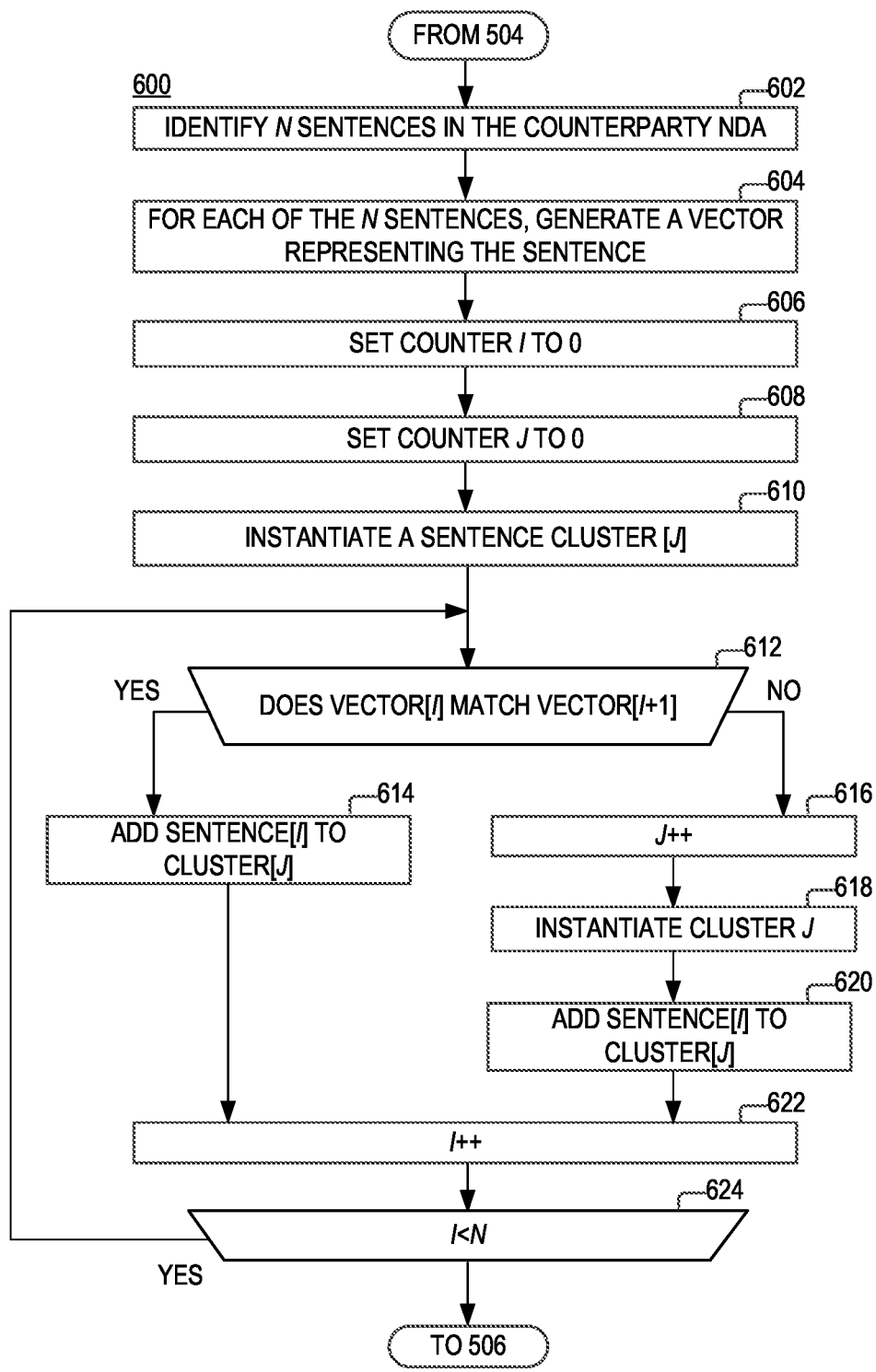
FIG. 6 is a flowchart of an example of a process, according to aspects of the disclosure.

FIG. 6 is a flowchart of an example of a process 600 for grouping sentences into clusters, as specified by step 508 of the process 500. At step 602, the contract analyzer 114 identifies a set of N sentences that are part of the counterparty NDA 122, where N is a positive integer greater than 1. The set of N sentences may include all sentences that are part of the counterparty NDA 122 or fewer than all sentences. At step 604, for each of the sentences (identified at step 602), the contract analyzer 114 generates a respective vector representing the sentence. Each of the respective vectors may be generated by using text2vec or another similar technique. Each of the respective vectors, may have the same or similar structure to the user and counterparty provision vectors that are discussed above with respect to FIG. 2B and FIG. 5. At step 606, the contract analyzer 114 sets a counter I to 0. At step 608, the contract analyzer sets a counter J to 0. At step 610, the contract analyzer instantiates a sentence cluster having index J. At step 612, the contract analyzer detects if the I-th sentence in the set of N sentences matches the next sentence in the set. More particularly, the contract analyzer determines a distance between the vector representing the I-th sentence (generated at step 604) and the vector representing the next sentence (i.e., the vector representing sentence I+1). If the distance is less than a threshold, the I-th sentence and the next sentence in the set are determined to match and the process 600 proceeds to step 614. Otherwise, if the distance is greater than a threshold, the I-th sentence and the next sentence are determined not to match, and the process 600 proceeds to step 616. At step 614, the I-th sentence is added to the cluster having index J. At step 616, the counter J is incremented. At step 618, a cluster having an index J is instantiated (after counter J is incremented at step 616). At step 620, the I-th sentence is added to the cluster having index J. At step 622, the counter I is incremented. At step 624, a determination is made if the current value of counter I is less than or equal to the total count of sentences in the set (identified at step 602). If the current value of I is less than or equal to the total count of sentences in the set, the process 600 returns to step 612. Otherwise, if the current value of I is greater than the total count of sentences in the set, this is an indication that all sentences in the set have been clustered, and the process 600 ends.

The process 600 is provided as an example. Although the process 600 relies on pairwise comparisons to identify semantically similar sentences (which are grouped together into the same cluster), alternative implementations are possible in which triplet comparisons, out-of-order comparisons, and/or any other suitable method is used to generate the sentence clusters. Stated succinctly, the present disclosure is not limited to any specific type of technique for generating clusters of sentences that have the same topic (i.e., clusters of sentences that concern the same legal issue that is being addressed by a contract, etc.).

Figure 7:
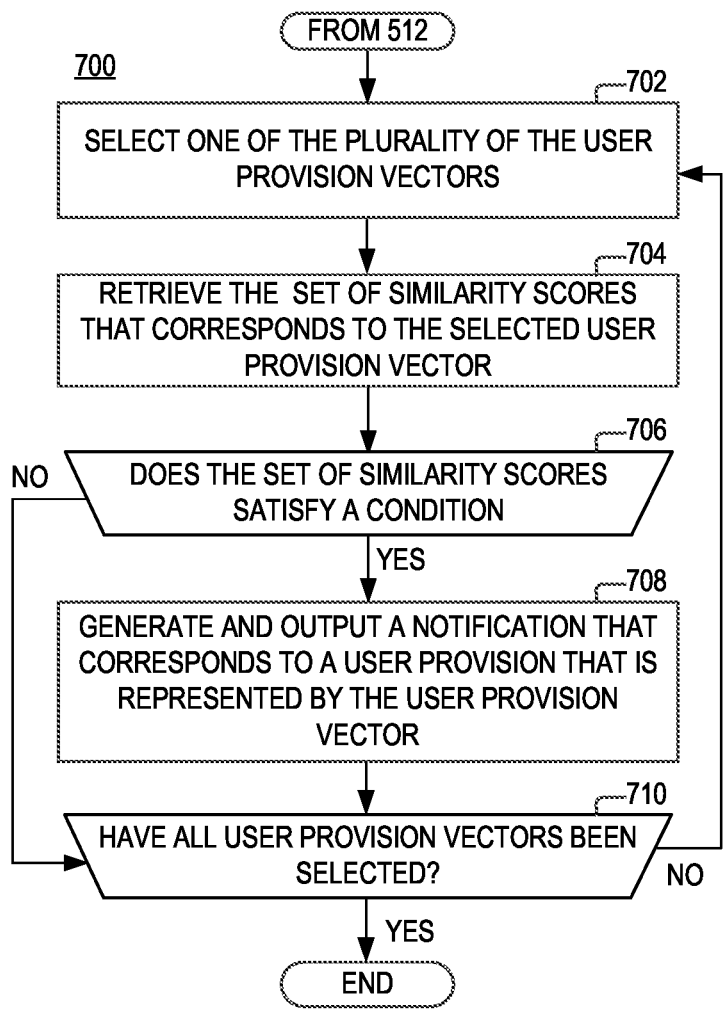
FIG. 7 is a flowchart of an example of a process, according to aspects of the disclosure.

FIG. 7 is a flowchart of an example of a process 700 for outputting provision notifications, as specified by step 514 of the process 500. At step 702, a user provision vector is selected from the user NDA template 124. The selected user provision vector may be one that has not been selected during an earlier iteration of steps 702-710. At step 704, the set of similarity scores (calculated at step 512) for the user provision vector (selected at step 702) is retrieved. At step 706, a determination is made if the set of similarity scores satisfies a condition that is associated with the user provision vector (selected at step 702). If the condition is satisfied, the process 700 proceeds to step 708. Otherwise, if the provision is not satisfied, the process 700 proceeds to step 710. At step 708, the contract analyzer 114 generates and outputs a notification that is associated with the user provision represented by the user provision vector (selected at step 702). At step 710, the contract analyzer 114 determines if all user provision vectors in the user NDA template 124 have been selected. If not all user provision vectors have been selected yet, the process 700 returns to step 702 and another one of the user provision vectors is selected. Otherwise, if not all user provision vectors have been selected, the process 700 ends.

In some implementations, when the user provision vector (selected at step 702) corresponds to a required user provision, the condition (evaluated at step 706) may be satisfied when the largest similarity score in the set (retrieved at step 704) fails to meet a predetermined threshold. In such instances, the notification output at step 708) may include an indication that a required provision is missing from the counterparty NDA 122.

Additionally or alternatively, when the user provision vector (selected at step 702) corresponds to a required user provision, the condition (evaluated at step 706) may be satisfied when at least one similarity score in the set (retrieved at step 704) meets a predetermined threshold. In such instances, the notification output at step 708) may include an indication that a required provision is present in the counterparty NDA 122.

In some implementations, when the user provision vector (selected at step 702) corresponds to a forbidden user provision, the condition (evaluated at step 706) may be satisfied when the largest similarity score in the set (retrieved at step 704) fails to meet a predetermined threshold. In such instances, the notification output at step 708) may include an indication that a forbidden provision is missing from the counterparty NDA 122.

Additionally or alternatively, when the user provision vector (selected at step 702) corresponds to a forbidden provision, the condition (evaluated at step 706) may be satisfied when at least one similarity score in the set (retrieved at step 704) meets a predetermined threshold. In such instances, the notification output at step 708) may include an indication that a forbidden provision is present in the counterparty NDA 122.

In some implementations, when the user provision vector (selected at step 702) corresponds to a recommended provision, the condition (evaluated at step 706) may be satisfied when the largest similarity score in the set (retrieved at step 704) fails to meet a predetermined threshold. In such instances, the notification output at step 708) may include an indication that a recommended provision is missing from the counterparty NDA 122.

Additionally or alternatively, when the user provision vector (selected at step 702) corresponds to a recommended provision, the condition (evaluated at step 706) may be satisfied when at least one similarity score in the set (retrieved at step 704) meets a predetermined threshold. In such instances, the notification output at step 708) may include an indication that a recommended provision is present in the counterparty NDA 122.

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. As noted above, in some implementations, the contract analyzer 114 may be configured to analyze a different type of contract (i.e. a contract that is not an NDA). In some such implementations, the contract analyzer 114 may utilize a user contract template, whose user provision vectors represent provisions in the user's form for the other type of contract.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid-state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method, comprising:
  obtaining, by a contract analyzer that is executed on a computing device, a counterparty contract, the counterparty contract including a contract that is being proposed by a counterparty to a user;
  performing, by the contract analyzer, a segmentation of the counterparty contract to generate a plurality of sentence clusters, each of the plurality of sentence clusters corresponding to a different provision in the counterparty contract, wherein generating the plurality of sentence clusters includes: generating a plurality of vectors, each vector representing a different sentence in the counterparty contract, comparing the respective vector for any given one of the plurality of sentences to a respective vector of a next sentence in the document, adding the given sentence to a current sentence cluster when the respective vector for the given sentence matches the respective vector of the next sentence, and instantiating a new cluster and adding the given sentence to the new cluster when the respective vector for the given sentence does not match the respective vector of the next sentence;

generating, by the contract analyzer, a plurality of counterparty provision vectors based on the counterparty contract, each of the plurality of counterparty provision vectors being generated based on a different one of the plurality of sentence clusters;

retrieving, by the contract analyzer, a user provision vector;

calculating, by the contract analyzer, a plurality of similarity scores for the user provision vector, the plurality of similarity scores being calculated based on the user provision vector and the plurality of counterparty provision vectors, each of the plurality of similarity scores indicating a degree of similarity between the user provision vector and a respective one of the plurality of counterparty provision vectors;

detecting, by the contract analyzer, whether the plurality of similarity scores satisfies a condition that is associated with the user provision; and outputting a notification associated with the user provision, the notification being based on an outcome of the detection.

2. The method of claim 1, further comprising displaying the counterparty contract in a graphical user interface of a word processor, wherein outputting the notification includes displaying the notification in the graphical user interface of the word processor.

3. The method of claim 1, wherein the counterparty contract includes a non-disclosure agreement that is being proposed by the counterparty to the user.

4. The method of claim 1, wherein the notification indicates that the user provision is missing from the counterparty contract.

5. The method of claim 1, wherein the condition is satisfied when at least one of the plurality of similarity scores meets a predetermined threshold, and the notification includes an indication that a forbidden provision is present the counterparty contract.

6. The method of claim 1, wherein the notification is generated in a file or object that is usable as a checklist for evaluating the counterparty contract.

7. A system, comprising:
a memory; and
at least one processor, the at least one processor being configured to perform the operations of:
obtaining a counterparty contract, the counterparty contract including a contract that is being proposed by a counterparty to a user;
performing a segmentation of the counterparty contract to generate a plurality of sentence clusters, each of the plurality of sentence clusters corresponding to a different provision in the counterparty contract, wherein generating the plurality of sentence clusters includes: generating a plurality of vectors, each vector representing a different sentence in the counterparty contract, comparing the respective vector for any given one of the plurality of sentences to a respective vector of a next sentence in the document, adding the given sentence to a current sentence cluster when the respective vector for the given sentence matches the respective vector of the next sentence, and instantiating a new cluster and adding the given sentence to the new cluster when the respective vector for the given sentence does not match the respective vector of the next sentence;

generating a plurality of counterparty provision vectors based on the counterparty contract, each of the plurality of counterparty provision vectors being generated based on a different one of the plurality of sentence clusters;

retrieving a user provision vector;

calculating a plurality of similarity scores for the user provision vector, the plurality of similarity scores being calculated based on the user provision vector and the plurality of counterparty provision vectors, each of the plurality of similarity scores indicating a degree of similarity between the user provision vector and a respective one of the plurality of counterparty provision vectors;

detecting whether the plurality of similarity scores satisfies a condition that is associated with the user provision; and outputting a notification associated with the user provision, the notification being based on an outcome of the detection.

8. The system of claim 7, wherein the at least one processor is further configured to display the counterparty contract in a graphical user interface of a word processor, wherein outputting the notification includes displaying the notification in the graphical user interface of the word processor.

9. The system of claim 7, wherein the counterparty contract includes a non-disclosure agreement that is being proposed by the counterparty to the user.

10. The system of claim 7, wherein the notification indicates that the user provision is missing from the counterparty contract.

11. The system of claim 7, wherein the condition is satisfied when at least one of the plurality of similarity scores meets a predetermined threshold, and the notification includes an indication that a forbidden provision is present the counterparty contract.

12. The system of claim 7, wherein the notification is generated in a file or object that is usable as a checklist for evaluating the counterparty contract.

13. A non-transitory computer-readable medium storing one or more processor-executable instructions, which, when executed by at least one processor, cause the at least one processor to perform the operations of:
obtaining a counterparty contract, the counterparty contract including a contract that is being proposed by a counterparty to a user;
performing a segmentation of the counterparty contract to generate a plurality of sentence clusters, each of the plurality of sentence clusters corresponding to a different provision in the counterparty contract, wherein generating the plurality of sentence clusters includes: generating a plurality of vectors, each vector representing a different sentence in the counterparty contract, comparing the respective vector for any given one of the plurality of sentences to a respective vector of a next sentence in the document, adding the given sentence to a current sentence cluster when the respective vector for the given sentence matches the respective vector of the next sentence, and instantiating a new cluster and adding the given sentence to the new cluster when the respective vector for the given sentence does not match the respective vector of the next sentence;

generating a plurality of counterparty provision vectors based on the counterparty contract, each of the plurality of counterparty provision vectors being generated based on a different one of the plurality of sentence clusters;

retrieving a user provision vector;

calculating a plurality of similarity scores for the user provision vector, the plurality of similarity scores being calculated based on the user provision vector and the plurality of counterparty provision vectors, each of the plurality of similarity scores indicating a degree of similarity between the user provision vector and a respective one of the plurality of counterparty provision vectors;

detecting whether the plurality of similarity scores satisfies a condition that is associated with the user provision; and outputting a notification associated with the user provision, the notification being based on an outcome of the detection.

14. The non-transitory computer-readable medium of claim 13, wherein, one or more processor-executable instructions, when executed by the at least one processor, further cause the at least one processor to perform the operation of displaying the counterparty contract in a graphical user interface of a word processor, wherein outputting the notification includes displaying the notification in the graphical user interface of the word processor.

15. The non-transitory computer-readable medium of claim 13, wherein the counterparty contract includes a non-disclosure agreement that is being proposed by the counterparty to the user.

16. The non-transitory computer-readable medium of claim 13, wherein the notification indicates that the user provision is missing from the counterparty contract.

17. The non-transitory computer-readable medium of claim 13, wherein the condition is satisfied when at least one of the plurality of similarity scores meets a predetermined threshold, and the notification includes an indication that a forbidden provision is present the counterparty contract.

18. The non-transitory computer-readable medium of claim 13, wherein the notification is generated in a file or object that is usable as a checklist for evaluating the counterparty contract.

* * * * *